(12) United States Patent
Verma et al.

(10) Patent No.: US 11,784,746 B2
(45) Date of Patent: Oct. 10, 2023

(54) BANDWIDTH PUNCTURE AND RESPONSE RULES

(71) Applicant: Apple Inc., Cupertino, CA (US)

(72) Inventors: Lochan Verma, San Diego, CA (US);
Yong Liu, Campbell, CA (US); Jarkko L. Kneckt, Los Gatos, CA (US); Qi Wang, Sunnyvale, CA (US); Jinjing Jiang, San Jose, CA (US); Su Khiong Yong, Palo Alto, CA (US); Tianyu Wu, Fremont, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 17/194,782

(22) Filed: Mar. 8, 2021

(65) Prior Publication Data

US 2021/0281357 A1 Sep. 9, 2021

Related U.S. Application Data

(60) Provisional application No. 62/986,819, filed on Mar. 9, 2020.

(51) Int. Cl.
*H04L 1/00* (2006.01)
*H04L 5/00* (2006.01)
*H04W 84/12* (2009.01)

(52) U.S. Cl.
CPC .......... *H04L 1/0013* (2013.01); *H04L 5/0055* (2013.01); *H04W 84/12* (2013.01)

(58) Field of Classification Search
CPC ............................. H04L 1/0013; H04L 5/0055

USPC .......................................................... 370/329
See application file for complete search history.

(56) References Cited

U.S. PATENT DOCUMENTS

| | | | |
|---|---|---|---|
| 10,314,025 B1* | 6/2019 | Chu | H04L 1/1864 |
| 2016/0087775 A1* | 3/2016 | Hedayat | H04L 5/0055 |
| | | | 370/329 |
| 2016/0330714 A1* | 11/2016 | Hedayat | H04L 5/0023 |
| 2020/0014576 A1 | 1/2020 | Cherian et al. | |
| 2020/0052832 A1* | 2/2020 | Tian | H04L 1/1614 |
| 2020/0177425 A1 | 6/2020 | Chen et al. | |
| 2020/0288439 A1 | 9/2020 | Seok et al. | |
| 2021/0336827 A1* | 10/2021 | Park | H04L 1/0069 |

(Continued)

FOREIGN PATENT DOCUMENTS

WO 2020045910 A1 3/2020

*Primary Examiner* — Faisal Choudhury
(74) *Attorney, Agent, or Firm* — Kowert, Hood, Munyon, Rankin & Goetzel, P.C.

(57) ABSTRACT

An electronic device (such as an access point) that receives one or more block acknowledgments is described. This electronic device may transmit an extremely high-throughput (EHT) physical layer convergence protocol (PLCP) protocol data unit (PPDU) to a recipient electronic device, where the EHT PPDU is transmitted in multiple non-contiguous sub-bands that are separated by a punctured sub-band. Moreover, the electronic may receive the one or more block acknowledgments from the recipient electronic device, where the one or more block acknowledgments exclude the punctured sub-band. Note that the EHT PPDU may exclude transmitted energy in the punctured sub-band. Moreover, the punctured sub-band may have a bandwidth of at least 20 MHz and may be different from a primary sub-band.

20 Claims, 13 Drawing Sheets

(56) References Cited

U.S. PATENT DOCUMENTS

2021/0391947 A1* 12/2021 Jang ................ H04L 5/0044
2022/0124507 A1* 4/2022 Ryu ................ H04L 27/26

* cited by examiner

BANDWIDTH PUNCTURE AND RESPONSE RULES

CROSS-REFERENCE TO RELATED APPLICATION

This application claims the benefit of U.S. Provisional Application No. 62/986,819, entitled "Bandwidth Puncture and Response Rules," by Lochan Verma, et al., filed Mar. 9, 2020, the contents of which are hereby incorporated by reference.

FIELD

The described embodiments relate, generally, to wireless communications among electronic devices, including techniques for specifying bandwidth puncture and response rules, such as block acknowledgment rules.

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi').

IEEE 802.11be is considering the use of punctured transmission to a single user. For example, using a capability called 'preamble puncture,' an IEEE 802.11be-compatible electronic device may be able to operate an 80 MHz or a 160 MHz channel without interference, such as from a legacy electronic device. Notably, an electronic device may combine a primary 20 MHz sub-band with several secondary 20 MHz sub-bands into an 80 MHz channel.

In order to address interference from a nearby legacy electronic device on one of the secondary 20 MHz sub-bands, the electronic device may use preamble puncturing to continue transmitting on a 'punctured' 80 MHz channel. Notably, the electronic device may have a 60 MHz non-contiguous bandwidth, with 20 MHz and 40 MHz sub-bands separated by a 20 MHz puncture. Thus, the electronic device may have two disjointed sub-bands or RUs. However, the use of punctured transmissions poses challenges, such as the rules for punctured response frame in IEEE 802.11be transmissions, the rules for control/management frames, the rules for request/response frames, and/or the criteria for determining the location of the puncture in the bandwidth.

SUMMARY

An electronic device that receives one or more block acknowledgments is described. This electronic device may include: a node (or a pad or a connector) that is communicatively coupled to an antenna; and an interface circuit communicatively coupled to the node, where the interface circuit communicates with a recipient electronic device. During operation, the interface circuit may transmit, from the node, an extremely high-throughput (EHT) physical layer convergence protocol (PLCP) protocol data unit (PPDU) intended for (or addressed to) the recipient electronic device, where the EHT PPDU is transmitted in multiple non-contiguous sub-bands that are separated by a punctured sub-band. Moreover, the interface circuit may receive, at the node, one or more block acknowledgments associated with (or from) the recipient electronic device, where the one or more block acknowledgments exclude the punctured sub-band.

Note that the EHT PPDU may exclude transmitted energy in the punctured sub-band.

Moreover, the punctured sub-band may have a bandwidth of at least 20 MHz and may be different from a primary sub-band.

Furthermore, the one or more block acknowledgments may include multiple block acknowledgments in the multiple non-contiguous sub-bands and may exclude a block acknowledgment in the punctured sub-band.

Additionally, the one or more block acknowledgments may include a single block acknowledgment over a bandwidth of the multiple non-contiguous sub-bands and may exclude a bandwidth of the punctured sub-band.

In some embodiments, the one or more block acknowledgments may include a single block acknowledgment in a primary sub-band in the multiple non-contiguous sub-bands. Note that the block acknowledgment may exclude the bandwidth of the punctured sub-band.

Moreover, the electronic device may determine the multiple non-contiguous sub-bands that are separated by the punctured sub-band.

Furthermore, the interface circuit may provide, from the node, a bitmap intended for (or addressed to) the recipient electronic device that specifies the multiple non-contiguous sub-bands that are separated by the punctured sub-band.

Additionally, the interface circuit may receive, at the node, a bitmap associated with (or from) the recipient electronic device that specifies the multiple non-contiguous sub-bands that are separated by the punctured sub-band. In some embodiments, the interface circuit may provide, from the node, a request for the bitmap intended for (or addressed to) the recipient electronic device. Note that the bitmap is may be received on a per-PPDU basis and may specify the multiple non-contiguous sub-bands that are separated by the punctured sub-band for a subsequent PPDU. Moreover, the bitmap may be included in a field in a media access control (MAC) header in an uplink PPDU. Alternatively or additionally, the bitmap may be included in a multi-station block acknowledgment and may be specified by an association identifier (AID) value.

Other embodiments provide an integrated circuit (which is sometimes referred to as a 'communication circuit') for use with the electronic device. The integrated circuit may perform at least some of the aforementioned operations.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for receiving one or more block acknowledgments. The method includes at least some of the aforementioned operations performed by the electronic device.

Other embodiments provide a recipient electronic device that transmits one or more block acknowledgments. This recipient electronic device may include: a node (or a pad or a connector) that is communicatively coupled to an antenna; and a second interface circuit communicatively coupled to the node, where the second interface circuit communicates with an electronic device. During operation, the second interface circuit may receive, at the node, an EHT PPDU associated with (or from) the electronic device, where the EHT PPDU is received in multiple non-contiguous sub-bands that are separated by a punctured sub-band. Then, the second interface circuit may transmit, from the node, one or more block acknowledgments intended for (or addressed to) the electronic device, where the one or more block acknowledgments exclude the punctured sub-band.

Note that the EHT PPDU may exclude transmitted energy in the punctured sub-band.

Moreover, the punctured sub-band may have a bandwidth of at least 20 MHz and may be different from a primary sub-band.

Furthermore, the one or more block acknowledgments may include multiple block acknowledgments in the multiple non-contiguous sub-bands and may exclude a block acknowledgment in the punctured sub-band.

Additionally, the one or more block acknowledgments may include a single block acknowledgment over a bandwidth of the multiple non-contiguous sub-bands and may exclude a bandwidth of the punctured sub-band.

In some embodiments, the one or more block acknowledgments may include a single block acknowledgment in a primary sub-band in the multiple non-contiguous sub-bands. Note that the block acknowledgment may exclude the bandwidth of the punctured sub-band.

Moreover, the second interface circuit may receive, at the node, a bitmap associated with the electronic device that specifies the multiple non-contiguous sub-bands that are separated by the punctured sub-band.

Furthermore, the recipient electronic device may determine the multiple non-contiguous sub-bands that are separated by the punctured sub-band. Additionally, the second interface circuit may provide, from the node, a bitmap intended for (or addressed to) the electronic device that specifies the multiple non-contiguous sub-bands that are separated by the punctured sub-band. In some embodiments, the second interface circuit may receive, at the node, a request for the bitmap associated with the electronic device.

Note that the bitmap may be provided on a per-PPDU basis and may specify the multiple non-contiguous sub-bands that are separated by the punctured sub-band for a subsequent PPDU. For example, the bitmap may be included in a field in a MAC header in an uplink PPDU. Alternatively or additionally, the bitmap may be included in a multi-station block acknowledgment and is specified by an AID value.

Other embodiments provide a second integrated circuit (which is sometimes referred to as a 'communication circuit') for use with the recipient electronic device. The second integrated circuit may perform at least some of the aforementioned operations.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for transmitting one or more block acknowledgments. The method includes at least some of the aforementioned operations performed by the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
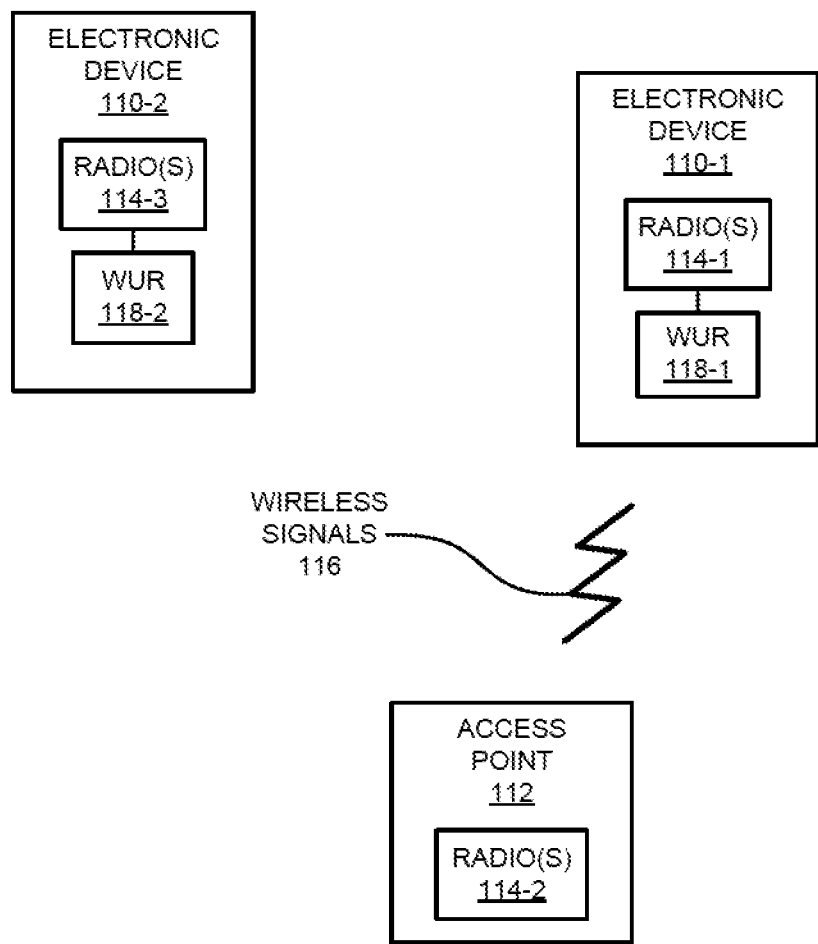
FIG. 1 is a block diagram illustrating an example of communication between electronic devices.

An electronic device (such as an access point) that receives one or more block acknowledgments is described. This electronic device may transmit an EHT PPDU to a recipient electronic device, where the EHT PPDU is transmitted in multiple non-contiguous sub-bands that are separated by a punctured sub-band. Moreover, the electronic may receive the one or more block acknowledgments from the recipient electronic device, where the one or more block acknowledgments exclude the punctured sub-band. Note that the EHT PPDU may exclude transmitted energy in the punctured sub-band. Moreover, the punctured sub-band may have a bandwidth of at least 20 MHz and may be different from a primary sub-band.

Moreover, a recipient electronic device (such as a cellular telephone, a computer, a wearable electronic device, or a portable electronic device) that transmits one or more block acknowledgments is described. This recipient electronic device may receive an EHT PPDU from the electronic device, where the EHT PPDU is received in multiple non-contiguous sub-bands that are separated by a punctured sub-band. Then, the recipient electronic device may transmit the one or more block acknowledgments to the electronic device, where the one or more block acknowledgments exclude the punctured sub-band. Note that the EHT PPDU may exclude transmitted energy in the punctured sub-band. Furthermore, the punctured sub-band may have a bandwidth of at least 20 MHz and may be different from a primary sub-band.

By providing feedback or responses about communication of the EHT PPDU using the one or more block acknowledgments, the communication techniques may facilitate the use of preamble puncture. These capabilities may improve the efficiency of spectrum usage and/or the communication performance when communicating in a WLAN using the electronic device and/or the recipient electronic device(s). Consequently, the communication techniques may improve the user experience and customer satisfaction.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have a connection with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 13:
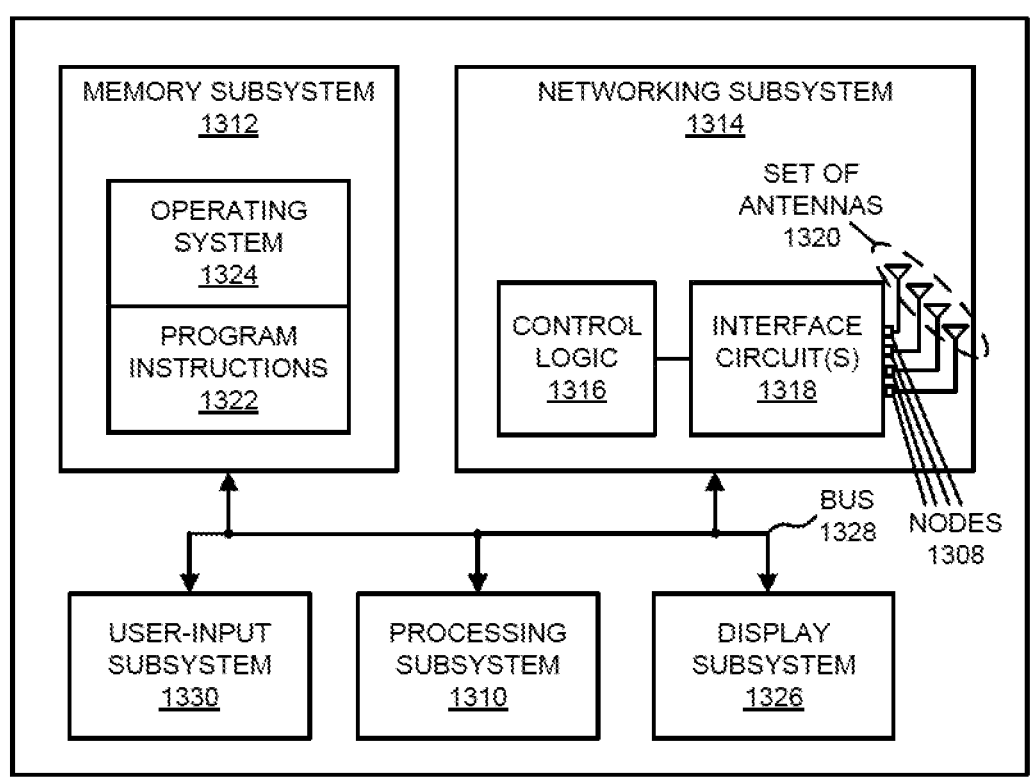
FIG. 13 is a block diagram illustrating an example of an electronic device of FIG. 1.

As described further below with reference to FIG. 13, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-12, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

As discussed previously, the use of punctured transmissions poses challenges, such as the rules for punctured response frame in IEEE 802.11be transmissions, the rules for control/management frames, the rules for request/response frames, and/or the criteria for determining the location of the puncture in the bandwidth.

In order to address these challenges, as described below with reference to FIGS. 2-12, in some embodiments of the disclosed communication techniques may provide feedback or responses that enable the use of preamble puncture. Notably, access point 112 and electronic device 110-1 may set up feedback or responses about communication between access point 112 and electronic device 110-1. For example, access point 112 may determine multiple non-contiguous sub-bands that are separated by a punctured sub-band. Then, access point 112 may provide a bitmap to electronic device 110-1 that specifies the multiple non-contiguous sub-bands that are separated by the punctured sub-band.

Alternatively, access point 112 may optionally provide a request to electronic device 110-1 for the bitmap. In response, electronic device 110-1 may determine the bitmap that specifies the multiple non-contiguous sub-bands that are separated by the punctured sub-band. Then, electronic device 110-1 may provide the bitmap to access point 112.

Next, access point 112 may transmit an EHT PPDU to electronic device 110-1, where the EHT PPDU is transmitted in the multiple non-contiguous sub-bands that are separated by the punctured sub-band. After receiving the EHT PPDU, electronic device 110-1 may transmit one or more block acknowledgments to access point 112, where the one or more block acknowledgments exclude the punctured sub-band. For example, the one or more block acknowledgments may include multiple block acknowledgments in the multiple non-contiguous sub-bands and may exclude a block acknowledgment in the punctured sub-band. Alternatively, the one or more block acknowledgments may include a single block acknowledgment over a bandwidth of the multiple non-contiguous sub-bands and may exclude a bandwidth of the punctured sub-band.

In summary, the communication techniques may be used to set up and then provide responses or feedback about communication between access point 112 and electronic device 110-1. Therefore, the communication techniques may facilitate the use of preamble puncture. These capabilities may improve the efficiency of spectrum usage and/or the communication performance when communicating in a WLAN using access point 112 and electronic device 110-1.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110. Consequently, one of electronic devices 110 may perform operations in the communication techniques.

Figure 2:
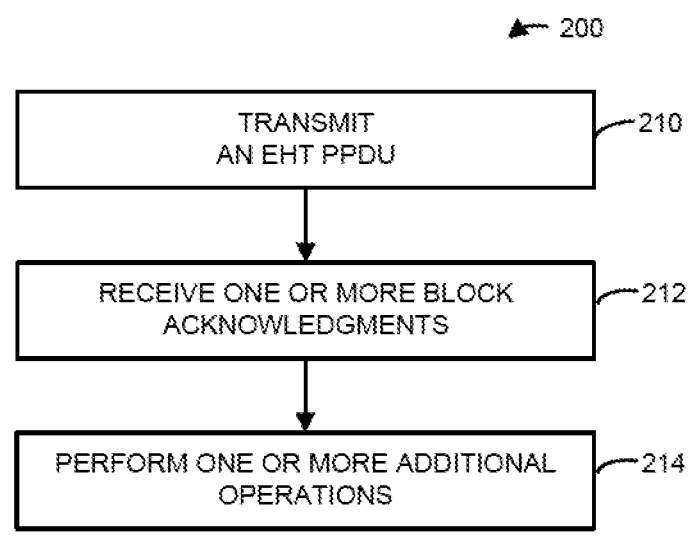
FIG. 2 is a flow diagram illustrating an example method for receiving one or more block acknowledgments using an electronic device of FIG. 1.

FIG. 2 presents a flow diagram illustrating an example method 200 for receiving one or more block acknowledgments. This method may be performed by an electronic device, such as access point 112 in FIG. 1. Note that the communication with a recipient electronic device may be compatible with an IEEE 802.11 communication protocol.

During operation, the electronic device may transmit an EHT PPDU (operation 210) to the recipient electronic device, where the EHT PPDU is transmitted in multiple non-contiguous sub-bands that are separated by a punctured sub-band. Moreover, the electronic device may receive the one or more block acknowledgments (operation 212) from the recipient electronic device, where the one or more block acknowledgments exclude the punctured sub-band.

Note that the EHT PPDU may exclude transmitted energy in the punctured sub-band. Moreover, the punctured sub-band may have a bandwidth of at least 20 MHz and may be different from a primary sub-band.

Furthermore, the one or more block acknowledgments may include multiple block acknowledgments in the multiple non-contiguous sub-bands and may exclude a block acknowledgment in the punctured sub-band. Alternatively, the one or more block acknowledgments may include a single block acknowledgment over a bandwidth of the multiple non-contiguous sub-bands and may exclude a bandwidth of the punctured sub-band.

In some embodiments, the one or more block acknowledgments may include a single block acknowledgment in a primary sub-band in the multiple non-contiguous sub-bands. Note that the block acknowledgment may exclude the bandwidth of the punctured sub-band.

In some embodiments, the electronic device optionally performs one or more additional operations (operation 214).

For example, the electronic device may determine the multiple non-contiguous sub-bands that are separated by the punctured sub-band.

Moreover, the electronic device may provide a bitmap to the recipient electronic device that specifies the multiple non-contiguous sub-bands that are separated by the punctured sub-band.

Furthermore, the electronic device may receive a bitmap from the recipient electronic device that specifies the multiple non-contiguous sub-bands that are separated by the punctured sub-band. In some embodiments, the electronic device may provide a request for the bitmap to the recipient electronic device. Note that the bitmap is may be received on a per-PPDU basis and may specify the multiple non-contiguous sub-bands that are separated by the punctured sub-band for a subsequent PPDU. Moreover, the bitmap may be included in a field in a media access control (MAC) header in an uplink PPDU. Alternatively or additionally, the bitmap may be included in a multi-station block acknowledgment and may be specified by an AID value.

Figure 3:
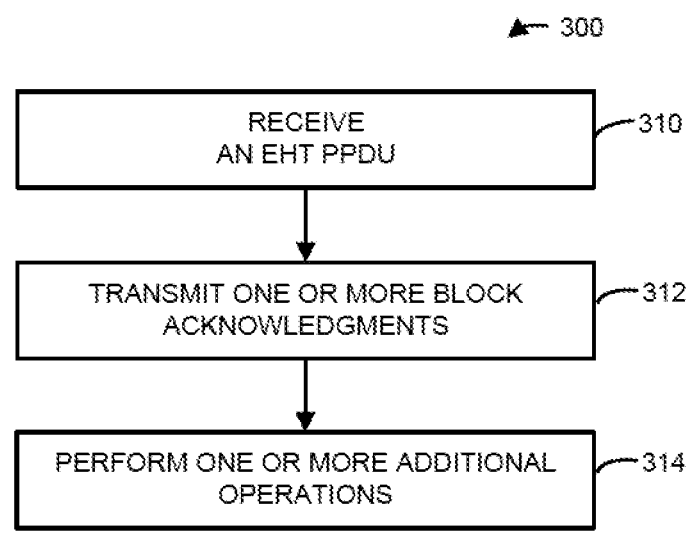
FIG. 3 is a flow diagram illustrating an example method for transmitting one or more block acknowledgments using an electronic device of FIG. 1.

FIG. 3 presents a flow diagram illustrating an example method 300 for transmitting one or more block acknowledgments. This method may be performed by a recipient electronic device, such as electronic device 110-1 in FIG. 1. Note that the communication with an electronic device may be compatible with an IEEE 802.11 communication protocol.

During operation, the recipient electronic device may receive an EHT PPDU (operation 310) from the electronic device, where the EHT PPDU is received in multiple non-contiguous sub-bands that are separated by a punctured sub-band. Then, the recipient electronic device may transmit the one or more block acknowledgments (operation 312) to the electronic device, where the one or more block acknowledgments exclude the punctured sub-band.

Note that the EHT PPDU may exclude transmitted energy in the punctured sub-band. Moreover, the punctured sub-band may have a bandwidth of at least 20 MHz and may be different from a primary sub-band.

Furthermore, the one or more block acknowledgments may include multiple block acknowledgments in the multiple non-contiguous sub-bands and may exclude a block acknowledgment in the punctured sub-band. Alternatively, the one or more block acknowledgments may include a single block acknowledgment over a bandwidth of the multiple non-contiguous sub-bands and may exclude a bandwidth of the punctured sub-band.

In some embodiments, the one or more block acknowledgments may include a single block acknowledgment in a primary sub-band in the multiple non-contiguous sub-bands. Note that the block acknowledgment may exclude the bandwidth of the punctured sub-band.

In some embodiments, the recipient electronic device optionally performs one or more additional operations (operation 314). For example, the recipient electronic device may receive a bitmap associated with the electronic device that specifies the multiple non-contiguous sub-bands that are separated by the punctured sub-band.

Moreover, the recipient electronic device may determine the multiple non-contiguous sub-bands that are separated by the punctured sub-band.

Furthermore, the recipient electronic device may provide a bitmap to the electronic device that specifies the multiple non-contiguous sub-bands that are separated by the punctured sub-band. In some embodiments, bitmap intended to may receive a request for the bitmap associated with the electronic device. Note that the bitmap may be provided on a per-PPDU basis and may specify the multiple non-contiguous sub-bands that are separated by the punctured sub-band for a subsequent PPDU. For example, the bitmap may be included in a field in a MAC header in an uplink PPDU. Alternatively or additionally, the bitmap may be included in a multi-station block acknowledgment and is specified by an AID value.

In some embodiments of method 200 (FIG. 2) and/or 300 there may be additional or fewer operations. Further, one or more different operations may be included. Moreover, the order of the operations may be changed, and/or two or more operations may be combined into a single operation or performed at least partially in parallel.

Figure 4:
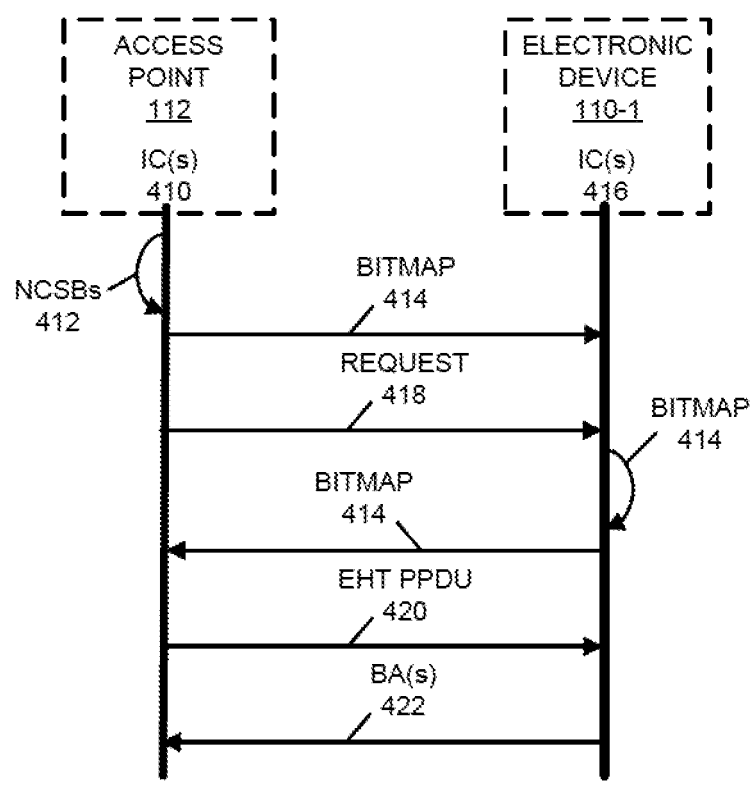
FIG. 4 is a drawing illustrating an example of communication among components in the electronic devices of FIG. 1.

The communication techniques are further illustrated in FIG. 4, which presents a flow diagram illustrating an example of communication among components in electronic device 110-1 and access point 112. During operation, an interface circuit (IC) 410 in access point 112 may determine multiple non-contiguous sub-bands (NCSBs) 412 that are separated by a punctured sub-band. Then, the interface circuit 410 may provide a bitmap 414 to electronic device 110-1 that specifies the multiple non-contiguous sub-bands that are separated by the punctured sub-band. Moreover, an interface circuit 416 in electronic device 110-1 may receive bitmap 414.

Alternatively, interface circuit 410 may provide a request 418 to electronic device 110-1 for bitmap 414. After receiving request 418, interface circuit 416 may determine bitmap 414 that specifies the multiple non-contiguous sub-bands that are separated by the punctured sub-band. Then, interface circuit 416 may provide bitmap 414 to access point 112, which may be received by interface circuit 410. (While FIG. 4 illustrates electronic device 110-1 determining bitmap 414 after receiving request 418, in other embodiments electronic device 110-1 determines bitmap 414 before receiving request 418. Alternatively, electronic device 110-1 may determine and may provide bitmap 414 without access point 112 providing request 418.)

Next, interface circuit 410 may transmit an EHT PPDU 420 to electronic device 110-1, where the EHT PPDU 420 is transmitted in the multiple non-contiguous sub-bands that are separated by the punctured sub-band. Then, interface circuit 416 may receive the EHT PPDU 420.

Furthermore, interface circuit 416 may transmit one or more block acknowledgments (BAs) 422 to access point 112, where the one or more block acknowledgments 422 exclude the punctured sub-band. For example, the one or more block acknowledgments 422 may include multiple block acknowledgments in the multiple non-contiguous sub-bands and may exclude a block acknowledgment in the punctured sub-band. Alternatively, the one or more block acknowledgments 422 may include a single block acknowledgment over a bandwidth of the multiple non-contiguous sub-bands and may exclude a bandwidth of the punctured sub-band. Additionally, interface circuit 410 may receive the one or more block acknowledgments 422.

While communication between the components in FIG. 4 are illustrated with unilateral or bilateral communication (e.g., lines having a single arrow or dual arrows), in general a given communication operation may be unilateral or bilateral.

Figure 5:
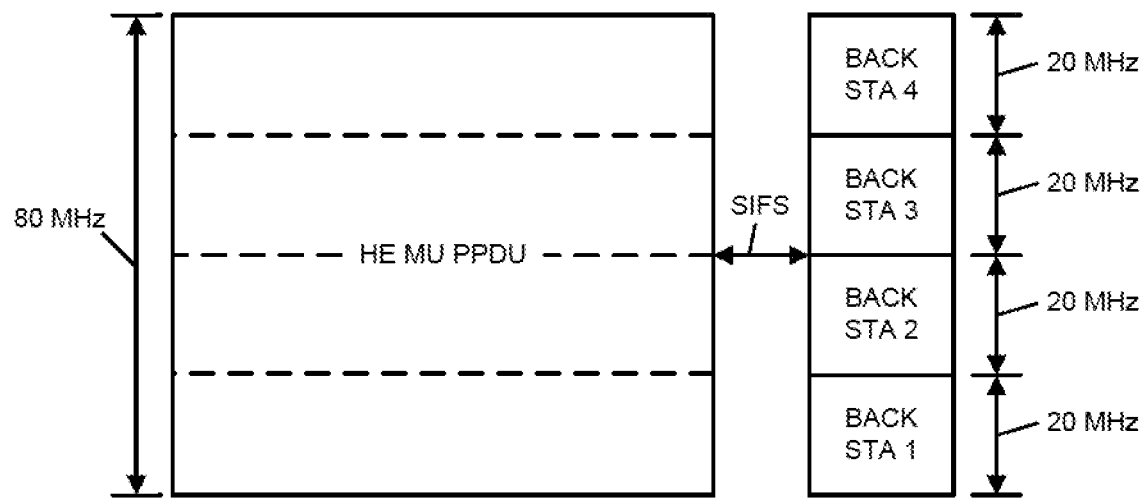
FIG. 5 is a drawing illustrating an example of communication between electronic devices of FIG. 1.

In some embodiments, the communication techniques facilitate the use of a punctured preamble. IEEE 802.11ax provides different options for acknowledging a downlink (DL) high-efficiency (HE) multi-user (MU) PPDU. As shown in FIG. 5, which presents a drawing illustrating an example of communication between access point 112 and electronic devices 110, in a first option a HE MU PPDU may indicates to a station or STA (which is sometimes referred to as a 'client' or a 'recipient electronic device') the resources to use for transmission of an uplink (UL) OFDMA response. (While communication between access point 112 and one or more of electronic devices 110 is used as an illustration in the discussion that follows, more generally the communication techniques may be used during communication between other electronic devices, such as between at least two of electronic devices 110.) The HE MU PPDU may contain a trigger response scheduling (TRS) control field or a trigger frame. Note that, depending on their capabilities, stations may use non-high-throughput (HT) duplicate uplink (DUP) block acknowledgment (BACK) format or an HE BACK format. Thus, following a short interframe space (SIFS), the BACKs may be provided in parallel in different sub-bands or resource units (RUs) associated with different stations.

Figure 6:
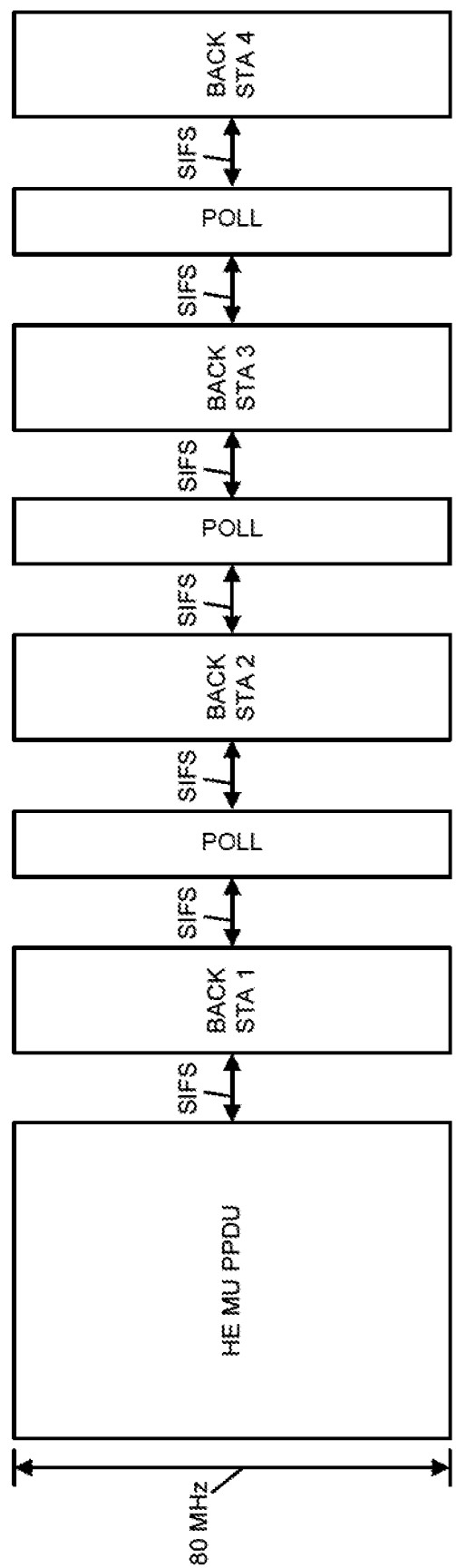
FIG. 6 is a drawing illustrating an example of communication between electronic devices of FIG. 1.

Alternatively, as shown in FIG. 6, which presents a drawing illustrating an example of communication between access point 112 and electronic devices 110, in a second option a HE MU PPDU followed by explicit poll (such as a BACK request) and a BACK per station. Thus, the BACKs for different stations may be provided serially using the full bandwidth. Note that the stations may use a non-HT DUP BACK format or an HE BACK format.

Figure 7:
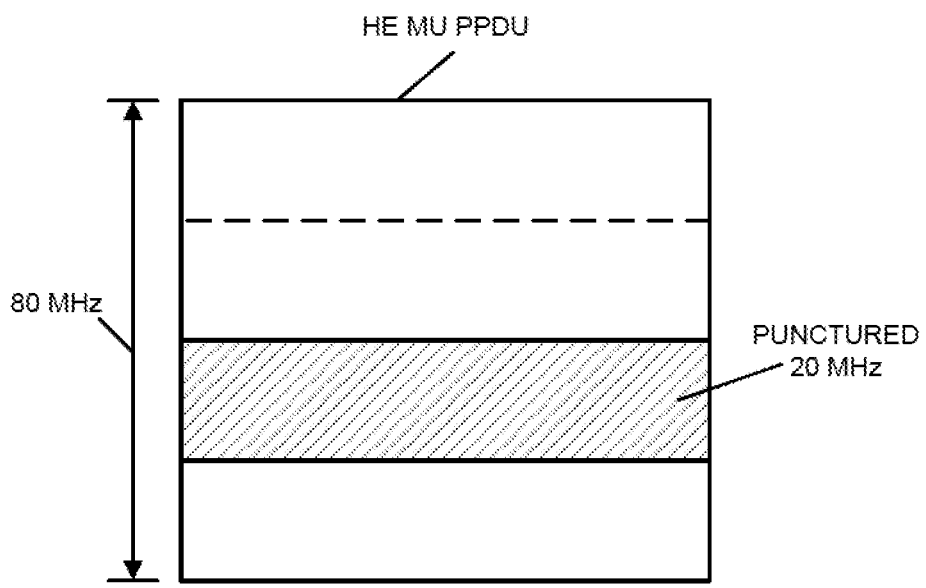
FIG. 7 is a drawing illustrating an example of communication between electronic devices of FIG. 1.

IEEE 802.11be is considering the use of punctured transmission to a single user. For example, as shown in FIG. 7, which presents a drawing illustrating an example of communication between access point 112 and electronic devices 110, the user may have a 60 MHz non-contiguous bandwidth, with 20 MHz and 40 MHz sub-bands separated by a 20 MHz puncture. Thus, a client may have two disjointed sub-bands or RUs. However, as noted previously, the use of punctured transmissions poses challenges, such as the rules for punctured response frame in IEEE 802.11be transmissions, the rules for control/management frames, the rules for request/response frames, and the criteria for determining the location of the puncture in the bandwidth.

Figure 8:
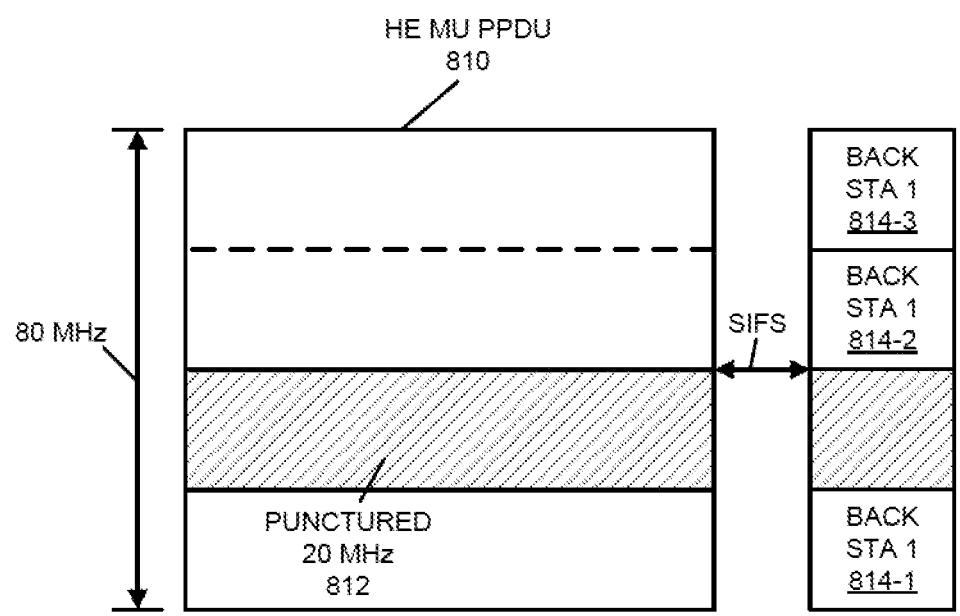
FIG. 8 is a drawing illustrating an example of communication between electronic devices of FIG. 1.

Moreover, there may be different options for punctured response frame rules in IEEE 802.11be. A first option is shown in FIG. 8, which presents a drawing illustrating an example of communication between access point 112 and electronic device 110-1. Notably, in a punctured transmission of HE MU PPDU 810 to a single user, the destination may respond with a BACK on the bandwidth (excluding puncture 812) on which the preceding frame is received. Thus, BACKs 814 may be provided in parallel in each 20 MHz sub-band or RU within a bandwidth, except for the sub-band corresponding to the puncture. Note that the BACK format may be non-HT DUP (e.g., there may be three separate responses).

Figure 9:
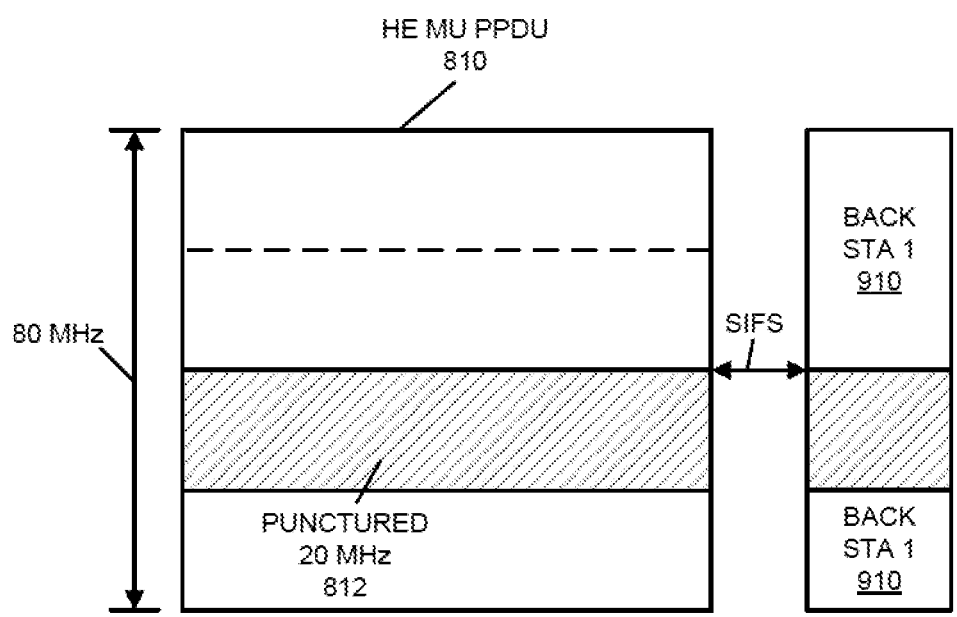
FIG. 9 is a drawing illustrating an example of communication between electronic devices of FIG. 1.

Alternatively, as shown in FIG. 9, which presents a drawing illustrating an example of communication between access point 112 and electronic device 110-1, the BACK format may be an EHT frame, where the bandwidth (BW) and puncture information is in the preamble. In this case, there may be a single BACK 910 over the full allocated bandwidth, excluding the puncture.

Figure 10:
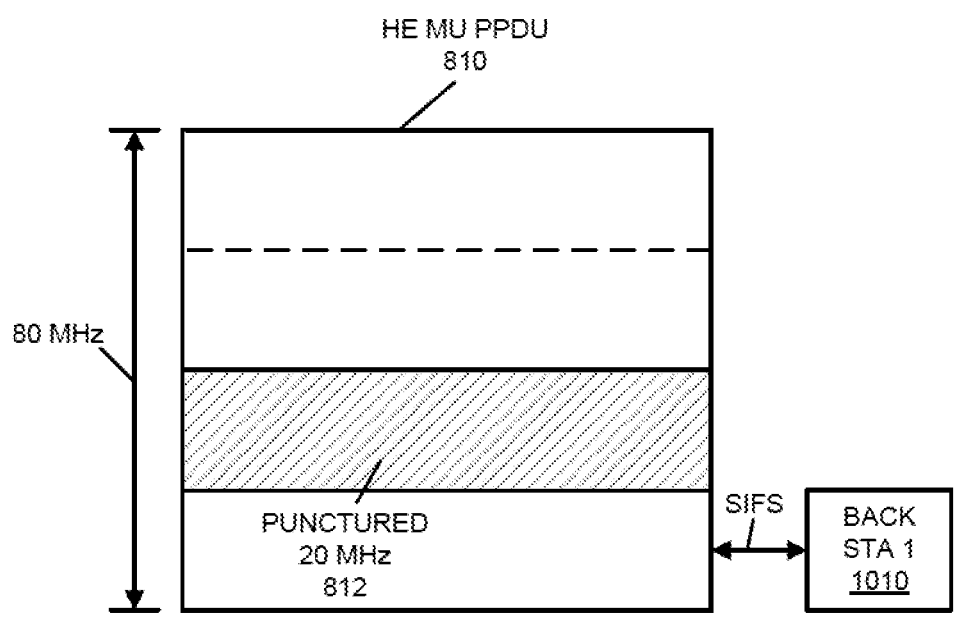
FIG. 10 is a drawing illustrating an example of communication between electronic devices of FIG. 1.

As shown in FIG. 10, which presents a drawing illustrating an example of communication between access point 112 and electronic device 110-1, in a second option, in a punctured transmission to a single user, the destination may respond with a BACK 1010 on the primary 20 MHz channel encompassed in the bandwidth on which the preceding frame is received. Note that the BACK format may be non-HT DUP or an EHT frame.

These response frame rules may be applicable to: data, such as BACK exchanges; a control request, such as a control response frame type exchange; or a management frame, such as acknowledgment (ACK) exchanges.

Figure 11:
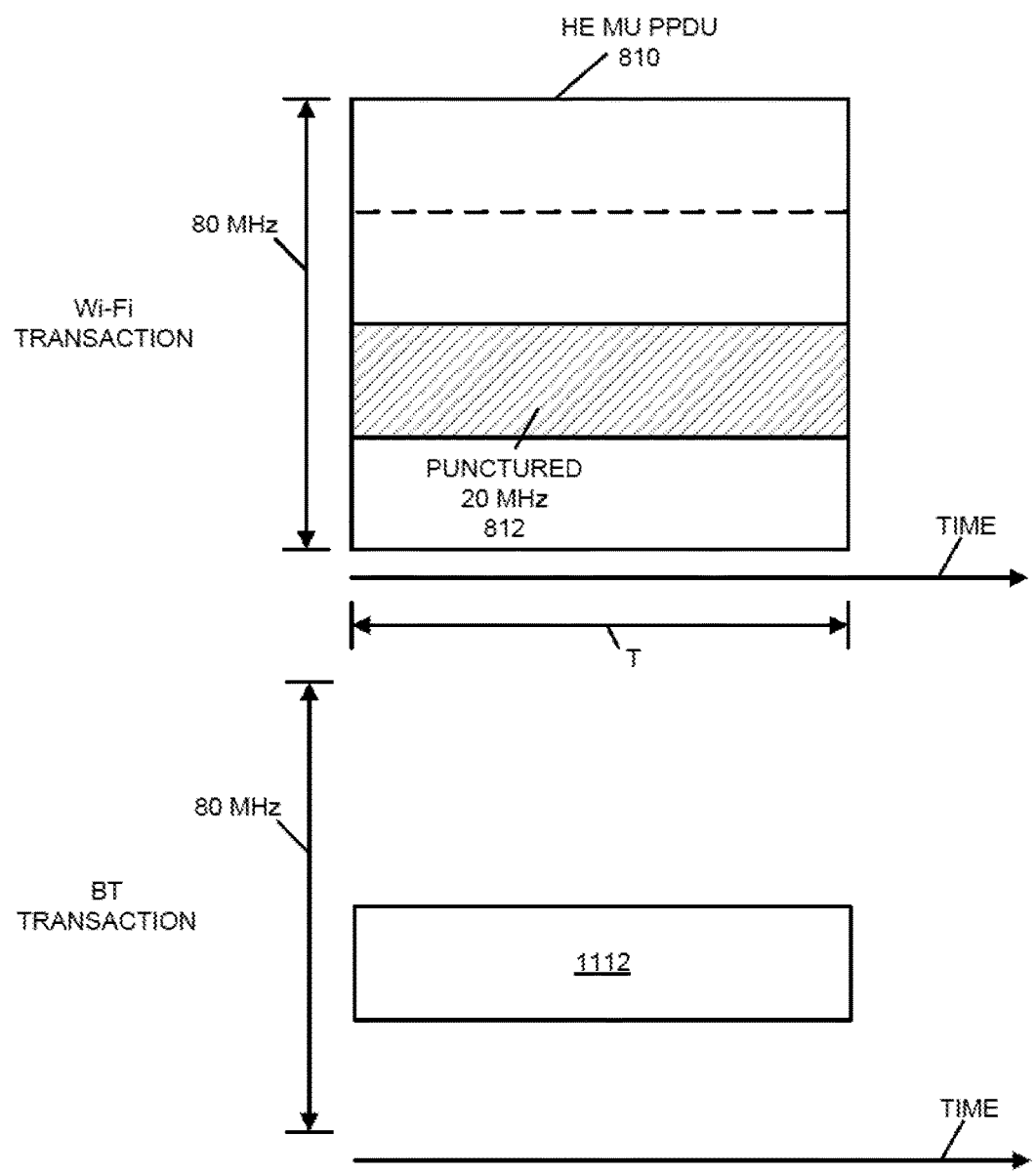
FIG. 11 is a drawing illustrating an example of communication between electronic devices of FIG. 1.

Furthermore, as shown in FIG. 11, which presents a drawing illustrating an example of communication between access point 112, electronic device 110-1 and accessory 1110, there may be different options for determining the location of a puncture in the bandwidth. For example, in a DL transmission, an access point (which is sometimes referred to as an 'electronic device') may decide the location of the puncture in the bandwidth. Notably, in a first option, the access point may determine the location based at least in part on its knowledge of bandwidth availability per 20 MHz basis (e.g., an incumbent presence, dynamic frequency selection or DFS channel, etc.) during a time interval T. Alternatively, in a second option, the access point may determine the location based at least in part on feedback (solicited or unsolicited) from a client. The client may want to puncture certain bandwidth portions on a Wi-Fi PPDU for better coexistence (through improved frequency isolation) with, e.g., a Bluetooth™ (BT) transmission at the client to accessory 1110 (which may concurrently use a partial or full bandwidth 1112 associated with puncture 812). Note that the minimum puncture bandwidth may be, e.g., 20 MHz for ease of implementations, because Wi-Fi uses 20 MHz bandwidth building blocks.

Additionally, there may be different options for indicating the location of a puncture to the access point from the client. Notably, a client may indicate the location of a puncture in the bandwidth through: a bitmap (e.g., a 16-bit bitmap that indicates 1 bit for each 20 MHz in a 320 MHz bandwidth); in a semi-static setting (e.g., the bitmap may be exchanged using a request-response exchange between an access point and the client, and may have a duration, such as 100 ms or the beacon interval) or in a per-PPDU setting (e.g., the bitmap may be exchanged using an UL PPDU preceding the current DL transmission, such as in a media access control or MAC header).

Note that the bitmap may be contained in an A-Control field of a MAC header if a quality-of-service (QoS) data frame is included in the UL PPDU. If the UL PPDU is a BACK frame, then the client may use a multi-station BACK format instead of a BACK. The multi-station BACK format may use a special AID value to indicate information about the puncturing bitmap.

Figure 12A:
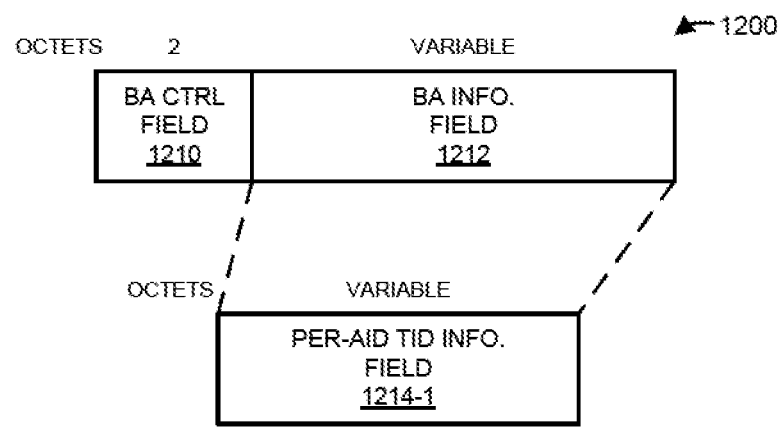
FIG. 12A is a drawing illustrating an example of a block acknowledgment communicated between electronic devices of FIG. 1.

These two options are illustrated in FIG. 12A, which presents a drawing illustrating an example of a block acknowledgment 1200 communicated between access point 112 and electronic device 110-1. Notably, block acknowledgment control field 1210 may indicate the block acknowledgment type. The block acknowledgment type may indicate either a multi-station traffic identifier (TID) or a special block acknowledgment type. Moreover, block acknowledgment information field 1212 may include one or more instances of a per-AID TID information field (such as per-AID TID information field 1214-1) for each <AID, TID> tuple.

Figure 12B:
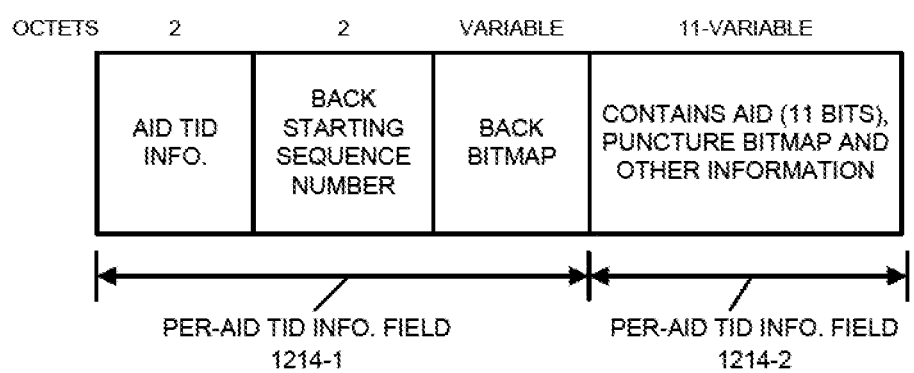
FIG. 12B is a drawing illustrating an example of a block acknowledgment communicated between electronic devices of FIG. 1.

FIG. 12B presents a drawing illustrating an example of per-AID TID information fields 1214 in a block acknowledgment communicated between access point 112 and electronic device 110-1. Notably, the AID (which may include 11 bits) in the per-AID TID information field 1214-2 may be set to a special value to indicate that the per-AID TID information field 1214-2 contains a puncture bitmap from a destination for the next transmission and other information. Moreover, the per-AID TID information field 1214-1 may indicate whether current transmissions in different sub-bands or RUs succeeded or failed.

In some embodiments, transmissions in a basic service set (BSS) may follow the puncture pattern specified in the puncture bitmap announced or provided by the access point. When there is a puncture in the EHT BSS operating bandwidth, the access point may indicate two separate BSS bandwidths using HE and EHT operation elements in, e.g., a beacon, etc. Note that HE electronic devices may be incapable of transmitting/receiving a single PPDU on two disjoint RUs. Consequently, these electronic devices may operate on the basis of a contiguous BSS operating bandwidth indicated in an HE operation element. However, EHT electronic devices are capable of transmitting/receiving a single PPDU on two disjoint Rus. Consequently, these electronic devices may operate on the basis of an EHT BSS operating bandwidth. Note that the EHT BSS operating bandwidth may be greater than or equal to the HE BSS operating bandwidth.

Moreover, the communication techniques may also be used to select the channel width for various frame types with preamble puncture. Notably, IEEE 802.11be may support transmission of EHT PPDUs with preamble puncture to a single station with a puncture resolution of, e.g., 20 MHz. Consequently, more than one large-size RU may be assigned to a single station. Note that a large-size RU may have 242 or more tones. Moreover, a transmitter may not transmit on the bandwidth that is preamble punctured. As described further below, there may be a variety of channel-width selection rules for different frame types with preamble puncture. In addition, signaling that enables preamble puncture location indication is described.

Furthermore, in the channel-width selection for control frames, a control frame may be sent by an EHT station in response to: a non-HT/non-HT DUP format frame with a bandwidth signaling transmitter address (TA) and that is not a clear-to-send (CTS) may be transmitted on an identical bandwidth (excluding the punctured bandwidth or sub-band) on which the frame eliciting the response was received; an EHT format frame may be transmitted on an identical bandwidth on which the frame eliciting the response was received; or a non-HT/non-HT DUP format frame with a non-bandwidth signaling transmitter address may be transmitted on a bandwidth that is no greater than that of the frame eliciting the response was received.

Additionally, the channel-width selection for an individually addressed data frame and management frame may include that: an EHT station may not transmit a frame using a bandwidth that is not permitted in the basic service set; and/or an EHT station may not transmit a frame using a bandwidth that is determined to be subjected to preamble puncture.

In some embodiments, the preamble puncture location determination may be determined autonomously by a transmitter using a proprietary technique. Alternatively or additionally, signaling enabling indication of one or more preamble puncture locations may be defined by a station.

Moreover, as discussed previously, a station may indicate the preamble puncture location in a BACK frame sent using a multi-station BACK format. Notably, a special reserved AID value may indicate that a per AID traffic identifier information field includes a puncture location indication.

Alternatively or additionally, a BSS-wide preamble puncture location indication may be specified by an access point. Notably, a new information element (e.g., a preamble puncture location information element) may be defined, where a bitmap indicates the 20 MHz subchannels and the corresponding 242-tone RUs that are subject to preamble puncture. For example, the bitmap may have a length of 16 bits, where a '0' indicates a corresponding subchannel or subband that is subject to preamble puncture, and a '1' indicates a corresponding subchannel that is available for use. Moreover, a lowest bit may correspond to the 20 MHz subchannel with the lowest frequency within a basic service set bandwidth.

In summary, channel-width selection for a control frame, individually addressed data frame and management frame with a preamble puncture has been described. In addition, signaling that enables a preamble puncture location indication by an EHT station was presented. These capabilities may enable the use of preamble puncture, which may improve the efficiency of spectrum usage and/or the communication performance when communicating in a WLAN.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 13 presents a block diagram of an electronic device 1300 (which may be a cellular telephone, a smartwatch, an access point, a wireless speaker, an IoT device, another electronic device, etc.) in accordance with some embodiments. This electronic device includes processing subsystem 1310, memory subsystem 1312 and networking subsystem 1314. Processing subsystem 1310 includes one or more devices configured to perform computational operations. For example, processing subsystem 1310 can include one or more microprocessors, application-specific integrated circuits (ASICs), microcontrollers, graphics processing units (GPUs), programmable-logic devices, and/or one or more digital signal processors (DSPs).

Memory subsystem 1312 includes one or more devices for storing data and/or instructions for processing subsystem 1310, and/or networking subsystem 1314. For example, memory subsystem 1312 can include dynamic random access memory (DRAM), static random access memory (SRAM), a read-only memory (ROM), flash memory, and/or other types of memory. In some embodiments, instructions for processing subsystem 1310 in memory subsystem 1312 include: program instructions or sets of instructions (such as program instructions 1322 or operating system 1324), which may be executed by processing subsystem 1310. For example, a ROM can store programs, utilities or processes to be executed in a non-volatile manner, and DRAM can provide volatile data storage, and may store instructions related to the operation of electronic device 1300. Note that the one or more computer programs may constitute a computer-program mechanism, a computer-readable storage medium or software. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310. In some embodiments, the one or more computer programs are distributed over a network-coupled computer system so that the one or more computer programs are stored and executed in a distributed manner.

In addition, memory subsystem 1312 can include mechanisms for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

Networking subsystem 1314 includes one or more devices configured to couple to and communicate on a wired and/or wireless network (i.e., to perform network operations), such as: control logic 1316, one or more interface circuits 1318 and a set of antennas 1320 (or antenna elements) in an adaptive array that can be selectively turned on and/or off by control logic 1316 to create a variety of optional antenna patterns or 'beam patterns.' Alternatively, instead of the set of antennas, in some embodiments electronic device 1300 includes one or more nodes 1308, e.g., a pad or a connector, which can be coupled to the set of antennas 1320. Thus, electronic device 1300 may or may not include the set of antennas 1320. For example, networking subsystem 1314 can include a Bluetooth networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 1314 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1300 may use the mechanisms in networking subsystem 1314 for performing simple wireless communication between the electronic devices, e.g., transmitting advertising or frame frames and/or scanning for advertising frames transmitted by other electronic devices.

Within electronic device 1300, processing subsystem 1310, memory subsystem 1312 and networking subsystem 1314 are coupled together using bus 1328 that facilitates data transfer between these components. Bus 1328 may include an electrical, optical, and/or electro-optical connection that the subsystems can use to communicate commands and data among one another. Although only one bus 1328 is shown for clarity, different embodiments can include a different number or configuration of electrical, optical, and/or electro-optical connections among the sub systems.

In some embodiments, electronic device 1300 includes a display subsystem 1326 for displaying information on a display, which may include a display driver and the display, such as a liquid-crystal display, a multi-touch touchscreen, etc. Display subsystem 1326 may be controlled by processing subsystem 1310 to display information to a user (e.g., information relating to incoming, outgoing, or an active communication session).

Electronic device 1300 can also include a user-input subsystem 1330 that allows a user of the electronic device 1300 to interact with electronic device 1300. For example, user-input subsystem 1330 can take a variety of forms, such as: a button, keypad, dial, touch screen, audio input interface, visual/image capture input interface, input in the form of sensor data, etc.

Electronic device 1300 can be (or can be included in) any electronic device with at least one network interface. For example, electronic device 1300 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 1300, in alternative embodiments, different components and/or subsystems may be present in electronic device 1300. For example, electronic device 1300 may include one or more additional processing subsystems, memory subsystems, networking subsystems, and/or display subsystems. Additionally, one or more of the subsystems may not be present in electronic device 1300. Moreover, in some embodiments, electronic device 1300 may include one or more additional subsystems that are not shown in FIG. 13. In some embodiments, electronic device may include an analysis subsystem that performs at least some of the operations in the communication techniques. Also, although separate subsystems are shown in FIG. 13, in some embodiments some or all of a given subsystem or component can be integrated into one or more of the other subsystems or component(s) in electronic device 1300. For example, in some embodiments program instructions 1322 are included in operating system 1324 and/or control logic 1316 is included in the one or more interface circuits 1318.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1314. This integrated circuit may include hardware and/or software mechanisms that are used for transmitting wireless signals from electronic device 1300 and receiving signals at electronic device 1300 from other electronic devices. Aside from the mechanisms herein described, radios are generally known in the art and hence are not described in detail. In general, networking subsystem 1314 and/or the integrated circuit can include any number of radios. Note that the radios in multiple-radio embodiments function in a similar way to the described single-radio embodiments.

In some embodiments, networking subsystem 1314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1322, operating system 1324 (such as a driver for an interface circuit in networking subsystem 1314) or in firmware in an interface circuit networking subsystem 1314. Alternatively or additionally, at least some of the operations in the communication techniques may be implemented in a physical layer, such as hardware in an interface circuit in networking subsystem 1314. In some embodiments, the communication techniques are implemented, at least in part, in a MAC layer and/or in a physical layer in an interface circuit in networking subsystem 1314.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used to determine the range. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a node configured to communicatively couple to an antenna; and
an interface circuit, communicatively coupled to the node, configured to communicate with a recipient electronic device, wherein the interface circuit is configured to:
transmit, from the node, an extremely high-throughput (EHT) physical layer convergence protocol (PLCP) protocol data unit (PPDU) intended for the recipient electronic device, wherein the EHT PPDU is transmitted in multiple non-contiguous sub-bands that are separated by a punctured sub-band; and
receive, at the node, one or more block acknowledgments associated with the recipient electronic device, wherein the one or more block acknowledgments exclude the punctured sub-band, and
wherein receiving the one or more block acknowledgments comprises: a single block acknowledgment concurrently received over a bandwidth of the multiple non-contiguous sub-bands and excluding a bandwidth of the punctured sub-band; or multiple instances of block acknowledgments concurrently received over the bandwidth of the multiple non-contiguous sub-bands and excluding the bandwidth of the punctured sub-band.

2. The electronic device of claim 1, wherein the EHT PPDU excludes transmitted energy in the punctured sub-band.

3. The electronic device of claim 1, wherein the punctured sub-band has a bandwidth of at least 20 MHz and is different from a primary sub-band.

4. The electronic device of claim 1, wherein the one or more block acknowledgments comprise a single block acknowledgment over a bandwidth of the multiple non-contiguous sub-bands and excludes a bandwidth of the punctured sub-band.

5. The electronic device of claim 1, wherein the one or more block acknowledgments comprise a single block acknowledgment in a primary sub-band in the multiple non-contiguous sub-bands.

6. The electronic device of claim 1, wherein the electronic device is configured to determine the multiple non-contiguous sub-bands that are separated by the punctured sub-band.

7. The electronic device of claim 1, wherein the interface circuit is configured to provide, from the node, a bitmap intended for the recipient electronic device that specifies the multiple non-contiguous sub-bands that are separated by the punctured sub-band.

8. The electronic device of claim 1, wherein the interface circuit is configured to receive, at the node, a bitmap associated with the recipient electronic device that specifies the multiple non-contiguous sub-bands that are separated by the punctured sub-band.

9. A recipient electronic device, comprising:
a node configured to communicatively couple to an antenna; and
an interface circuit, communicatively coupled to the node, configured to communicate with an electronic device, wherein the interface circuit is configured to:
receive, at the node, an extremely high-throughput (EHT) physical layer convergence protocol (PLCP) protocol data unit (PPDU) associated with the electronic device, wherein the EHT PPDU is received in multiple non-contiguous sub-bands that are separated by a punctured sub-band; and
transmit, from the node, one or more block acknowledgments intended for the electronic device, wherein the one or more block acknowledgments exclude the punctured sub-band, and
wherein transmitting the one or more block acknowledgments comprises: a single block acknowledgment concurrently transmitted over a bandwidth of the multiple non-contiguous sub-bands and excluding a bandwidth of the punctured sub-band; or multiple instances of block acknowledgments concurrently transmitted over the bandwidth of the multiple non-contiguous sub-bands and excluding the bandwidth of the punctured sub-band.

10. The recipient electronic device of claim 9, wherein the EHT PPDU excludes transmitted energy in the punctured sub-band.

11. The recipient electronic device of claim 9, wherein the punctured sub-band has a bandwidth of at least 20 MHz and is different from a primary sub-band.

12. The recipient electronic device of claim 9, wherein the one or more block acknowledgments comprise multiple block acknowledgments in the multiple non-contiguous sub-bands and exclude a block acknowledgment in the punctured sub-band.

13. The recipient electronic device of claim 9, wherein the one or more block acknowledgments comprise a single block acknowledgment in a primary sub-band in the multiple non-contiguous sub-bands.

14. The recipient electronic device of claim 9, wherein the recipient electronic device is configured to determine the multiple non-contiguous sub-bands that are separated by the punctured sub-band; and
wherein the interface circuit is configured to provide, from the node, a bitmap intended for the electronic device that specifies the multiple non-contiguous sub-bands that are separated by the punctured sub-band.

15. The recipient electronic device of claim 14, wherein the interface circuit is configured to receive, at the node, a request for the bitmap associated with the electronic device.

16. The recipient electronic device of claim 14, wherein the bitmap is provided on a per-PPDU basis and specifies the multiple non-contiguous sub-bands that are separated by the punctured sub-band for a subsequent PPDU.

17. The recipient electronic device of claim 16, wherein the bitmap is included in a field in a media access control (MAC) header in an uplink PPDU or in a multi-station block acknowledgment and is specified by an association identifier (AID) value.

18. An integrated circuit, comprising:
an input pad or connector; and
an interface circuit, coupled to the input pad or connector, configured to communicate with an electronic device, wherein the interface circuit is configured to:
receive an extremely high-throughput (EHT) physical layer convergence protocol (PLCP) protocol data unit (PPDU) associated with the electronic device, wherein the EHT PPDU is received in multiple non-contiguous sub-bands that are separated by a punctured sub-band; and
transmit one or more block acknowledgments intended for the electronic device, wherein the one or more block acknowledgments exclude the punctured sub-band, and
wherein transmitting the one or more block acknowledgments comprises: a single block acknowledgment concurrently transmitted over a bandwidth of the multiple non-contiguous sub-bands and excluding a bandwidth of the punctured sub-band; or multiple instances of block acknowledgments concurrently transmitted over the bandwidth of the multiple non-contiguous sub-bands and excluding the bandwidth of the punctured sub-band.

19. The integrated circuit of claim 18, wherein the integrated circuit is configured to determine the multiple non-contiguous sub-bands that are separated by the punctured sub-band.

20. The integrated circuit of claim 18, wherein the integrated circuit is configured to:
provide, from the node, a bitmap intended for the recipient electronic device that specifies the multiple non-contiguous sub-bands that are separated by the punctured sub-band; or
receive, at the node, a second bitmap associated with the recipient electronic device that specifies the multiple non-contiguous sub-bands that are separated by the punctured sub-band.

\* \* \* \* \*